Figure 1:
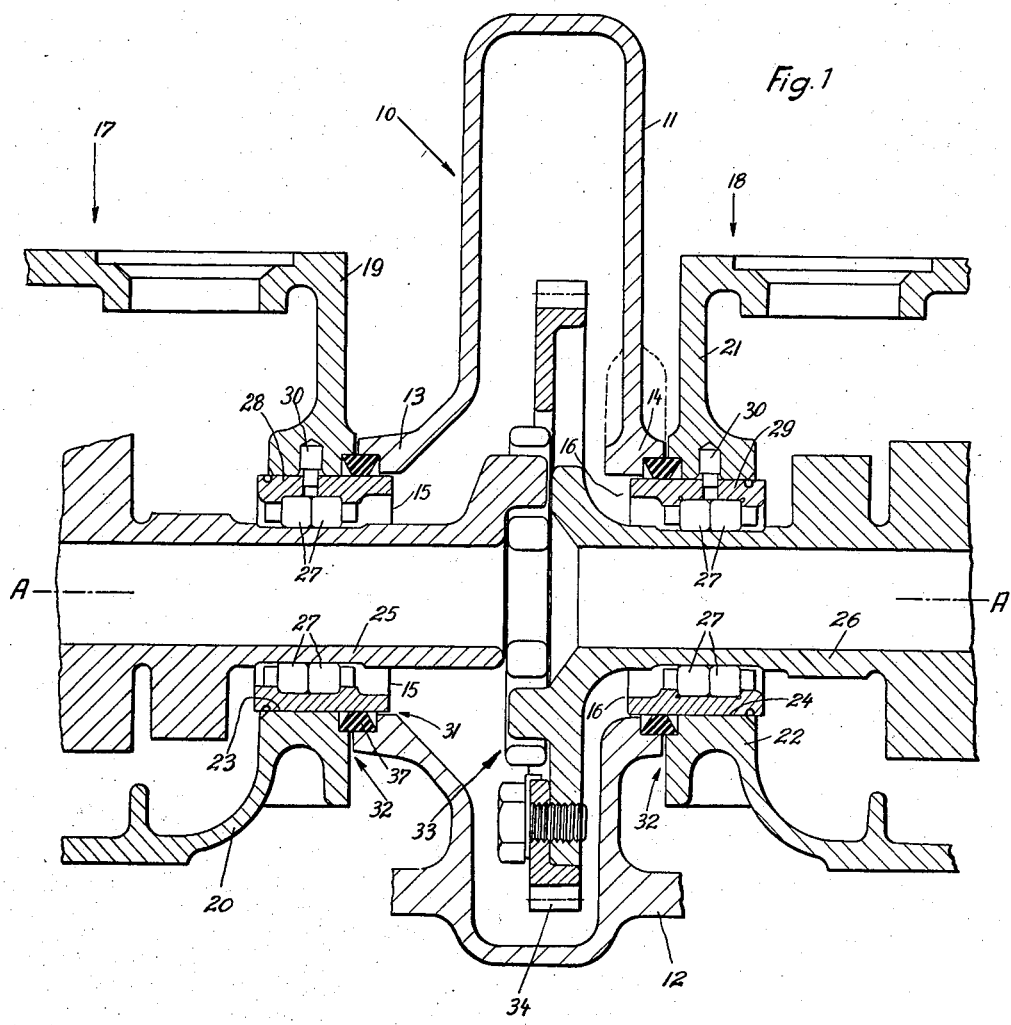

March 3, 1959     M. K. LORSCHEIDT     2,876,024

HOUSING SEAL FOR INTERNAL COMBUSTION ENGINES

Filed Oct. 17, 1955     2 Sheets-Sheet 1

Inventor
MANFRED K. LORSCHEIDT
BY Dicke and Craig
ATTORNEYS.

March 3, 1959 — M. K. LORSCHEIDT — 2,876,024
HOUSING SEAL FOR INTERNAL COMBUSTION ENGINES
Filed Oct. 17, 1955 — 2 Sheets-Sheet 2
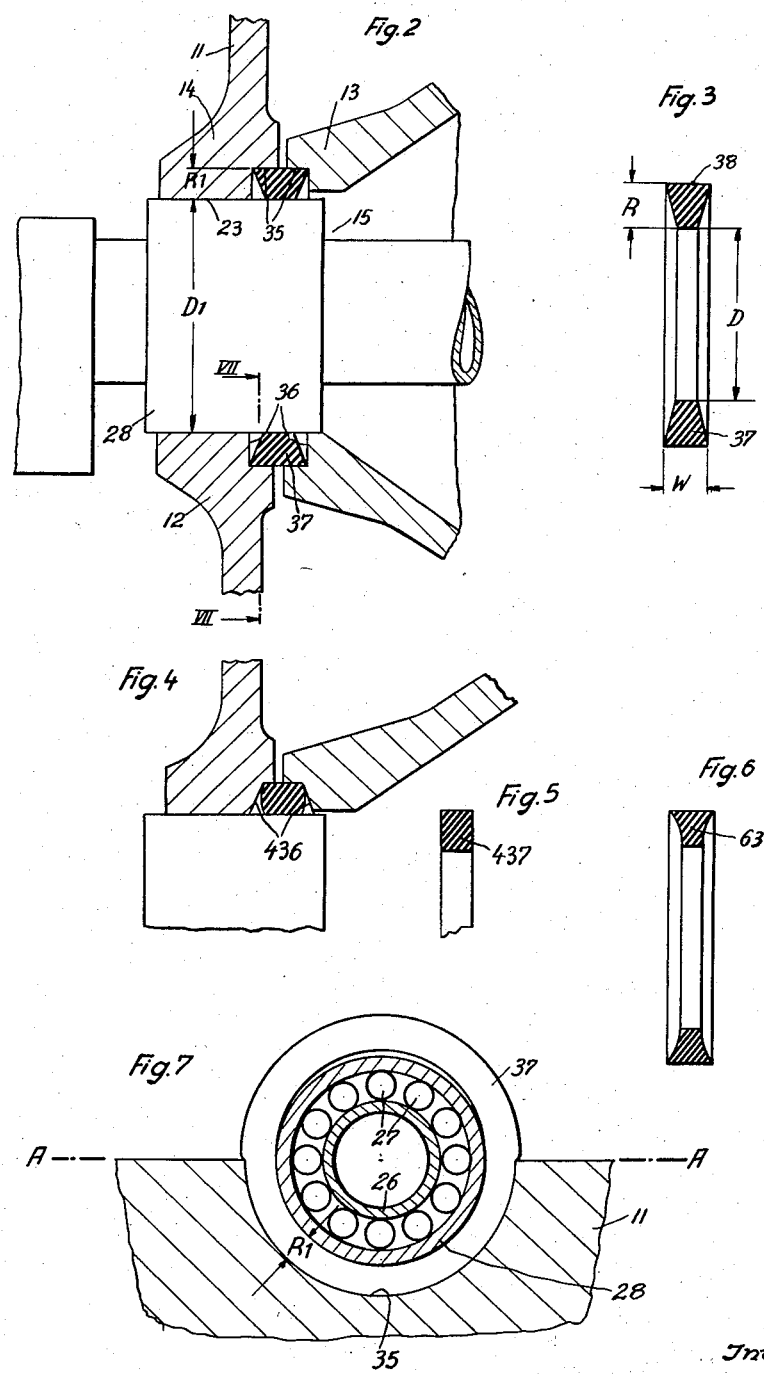
Inventor
MANFRED K. LORSCHEIDT
BY Dicke and Craig
ATTORNEYS.

United States Patent Office 2,876,024
Patented Mar. 3, 1959

2,876,024

HOUSING SEAL FOR INTERNAL COMBUSTION ENGINES

Manfred K. Lorscheidt, Stuttgart-Unterturkheim, Germany, assignor to Daimler-Benz Aktiengesellschaft, Stuttgart-Unterturkheim, Germany Application October 17, 1955, Serial No. 540,802

Claims priority, application Germany October 22, 1954

5 Claims. (Cl. 286—1)

My invention relates to a housing seal for internal combustion engines and, more particularly, to means for sealing the gap existing between adjacent housing through which a common shaft extends.

Numerous attempts to provide an effective seal for such gap have failed, particularly in cases where the housings are subject to relative vibration as is the case, for instance, in an internal combustion engine in which a crank casing is mounted adjacent to a gear box, a cam shaft extending from the former into the latter.

It is the object of my invention to provide improved sealing means which will overcome such difficulties and constitute an effective seal preventing oil from leaking through the gap outwardly, even where there is considerable relative vibration between the gear box and the crank casing or between other adjacent housings. It is a further object of the present invention to provide a seal of the character indicated which may be easily assembled and is simple, inexpensive and of long life.

Further objects of my invention will appear from a detailed description of a preferred embodiment thereof described hereinafter by way of example with reference to the accompanying drawings, it being understood that such detailed description serves the purpose of illustrating the invention rather than that of restricting or limiting the same. In the drawings, Fig. 1 is a vertical partial section through crank casings with an intervening gear box provided wtih my improved sealing means, Fig. 2 illustrates a part of Fig. 1 on an enlarged scale, the cam shaft and its roller bearing being shown in elevation, Fig. 3 is a sectional view of the sealing ring of Fig. 2 in disassembled and relaxed condition, Fig. 4 is a view similar to that of Fig. 2 of a modified seal, Fig. 5 is a partial sectional view of the sealing ring of Fig. 4 in disassembled and relaxed condition, Fig. 6 shows a modified sealing ring similar to that of Fig. 3, and Fig. 7 is a diagrammatical cross-sectional view of the cam shaft surrounded by a faulty sealing ring which in the course of the assembly has been inserted in the lower sections of two adjacent housings, the section being taken along the line VII—VII of Fig. 2.

Fig. 1 illustrates a vertical section taken through a split gear box 10 composed of an upper section 11 and of a lower section 12 which are joined to each other along a plane A—A, both sections of the gear box being provided with flanges which are suitably bolted together and contact each other along such plane. The side walls of the box 10 are formed with bosses 13 and 14 having registering openings 15 and 16.

On both sides of the gear box 10 there are disposed split crank cases 17 or 18, respectively. The crank case 17 comprises an upper section 19 and a lower section 20. Similarly, the crank case 18 is composed of an upper section 21 and of a lower section 22. The sections of each crank case are joined in the plane A—A and are bolted together by suitable screws not shown. The opposed walls of the crank cases are provided with registering circular bores 23, and 24 respectively, disposed coaxially with respect to the circular openings 15 and 16. A composite hollow cam shaft composed of sections 25 and 26 extends through the bores 23 and 24 and through the openings 15 and 16 in coaxial relationship thereto, each section of the composite cam shaft being journalled in a roller bearing or other anti-friction bearing comprised of rollers 27 and a bushing 28, or 29 respectively, constituting the outer race for the rollers. The bushing 28 is firmly seated in the bore 23, whereas the bushing 29 is firmly seated in the bore 24 being secured in position therein by suitable pins 30 inserted in the sections 19, and 21 respectively. The bushings 28 and 29 project into the opposed openings 15 and 16 of the gear box 10.

The crank cases 17 and 18 and the intervening gear box 10 are suitably mounted for relative vibration by suitable means not shown. In order to limit the transfer of vibration from the crank cases 17 and 18 to the gear box 10 to a minimum, clearances are provided between the boss 13, or 14 respectively, on the one hand and the crank cases 17, 18 and the bushings 28, 29 on the other hand, such clearances being shown at 31 and 32 for instance. The cam shaft sections 25, 26 are connected by an elastic clutch 33 which need not be described in detail as it does not form part of the invention. The composite cam shaft 25, 26 is provided with a gear 34 located within the gear box 10 serving the purpose of driving the cam shaft.

My novel sealing means serve the purpose of sealing the gaps 32 so as to prevent the leakage of oil from the interior of the gear box 10 and of the adjoining crank cases 17 and 18. For this purpose, the adjacent walls of the gear box 10 and of the crank cases 17 and 18 are provided with registering recesses which surround the opposed ends of the openings or bores 15, 23, and 16, 24 respectively, such recesses having cylindrical circumferential walls 35 and plane end walls 36 (Fig. 2). Hence, it will appear that the recesses surrounding the ends of openings 15 and 23 cooperate to constitute an annular groove of rectangular cross section. On its inside this groove is closed by the bushing 28. A resilient sealing ring 37 consisting, for instance, of a suitable oilproof synthetic rubber composition or other suitable plastic of rubber-like properties is inserted in the groove. In Fig. 3 I have shown the ring 37 in disassembled relaxed condition. It will be noted that its internal diameter D is substantially smaller than the diameter D1 of bushing 28. Moreover, it will be noted that the radial width R of ring 37 substantially exceeds the radial width R1 of the groove.

In assembling the engine I proceed as follows:

First the ball bearings including the bushings 28 and 29 are mounted on the pre-assembled cam shaft sections 25 and 26. Thereupon the sealing rings 37 are forced on the bushings and are considerably expanded in such operation whereby their axial widths are increased while their radial widths R are reduced, but are still in excess of the depths R1 of the grooves. Then the cam shaft with the ball bearings and the sealing rings thereon is placed in the housing sections 20, 12 and 22. In this operation the lower halves of the sealing ring 37 are further radially compressed because their radial widths R are reduced to the depth R1 of the grooves. This radial compression of the rings tends to increase the diameter thereof. Therefore, there will be a tendency of the upper half of the sealing rings 37 to be lifted from the bushing 38, as shown in Fig. 7. Experience has shown, however, that under such circumstances it will be extremely difficult to complete the assembly by putting the upper sections 19, 11 and 21 of the adjacent housings into place because the rubber ring offers a considerable resistance to radial compression. This is the reason why it is extremely important that the diameter D of the relaxed sealing ring is considerably smaller than the diameter D1 of the bushing so as to ensure that the tensional stress set up in the rubber ring upon assembly will not be entirely compensated by the radial compression of the ring. When this condition is complied with the upper half of ring 37 will tightly cling to the bushing 28 in the assembly step illustrated in Fig. 7 and will in no way interfere with the following phase of the assembly.

When the upper housing sections 19, 11 and 21 are put into place and radially compress the upper half of ring 37, the ring will be radially further compressed and expanded in axial direction. It is extremely important to provide an axial clearance between the sealing ring 37 and the side walls 36 of the groove to permit such axial expansion of the ring when the latter is radially compressed between the housing sections. In the embodiment shown, this axial clearance is provided for by the trapezoidal shape of the cross section of the sealing ring. As shown in Figs. 2 and 3, the larger base 38 of the trapezoid consitutes the outside of the sealing ring. In assembled condition the length of this base 38 equals the axial width of the groove, that is to say the distance between the side faces 36 thereof. Hence, it will appear that the axial clearance between the sealing ring 37 and the side walls 36 of the groove is a minimum at the bottom 35 of the groove. Also it will appear that the clearance is coextensive with the depth of the groove and decreases outwardly. Alternatively, I may make the cross section of the ring rectangular, as illustrated in Figs. 4 and 5 at 437. In this event, the end faces 436 of the groove are conical so as to provide for the axial clearance between the sealing ring 437 and the side walls 436.

In Fig. 6 I have shown still another embodiment of the sealing ring. It will be noted that this sealing ring 637 has a semi-trapezoidal cross section, the sides being slightly concave.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In an internal combustion engine, the combination comprising a pair of split housing mounted for relative vibration having adjacent walls provided with registering openings and with registering recesses surrounding the opposed ends of said openings and cooperating to constitute an annular groove, each of said housings being composed of a pair of sections adjoining in a plane including the axis of said openings, a bushing extending through said openings with a clearance relative to at least one of said openings, and a resilient sealing ring seated in said groove and dimensioned in relaxed condition to have an internal diameter substantially smaller than that of said bushing and to have a radial width substantially exceeding that of said groove, an axial clearance being provided between said sealing ring and the side walls of said groove to afford said ring space for axial expansion thereof when the latter upon assembly is radially compressed between said housing sections.

2. The combination claimed in claim 1 in which said axial clearance is coextensive with the depth of said groove and decreases outwardly.

3. The combination claimed in claim 1 in which said axial clearance is a minimum at the bottom of said groove.

4. The combination claimed in claim 1 in which the walls of said groove are parallel and in which the axial width of said sealing ring increases outwardly reaching its maximum on its outside, said maximum equalling the axial width of said groove.

5. The combination claimed in claim 1 in which said sealing ring has a trapezoidal cross section, the larger base thereof constituting the outside of said sealing ring and equalling the axial width of said groove.

References Cited in the file of this patent

UNITED STATES PATENTS

| | | |
|---|---|---|
| 1,980,580 | Gilmore | Nov. 13, 1934 |
| 2,208,620 | Baisch | July 23, 1940 |
| 2,473,267 | Wightman | June 14, 1949 |
| 2,653,063 | Arndt et al. | Sept. 22, 1953 |